(12) United States Patent
Yang et al.

(10) Patent No.: US 9,360,616 B2
(45) Date of Patent: Jun. 7, 2016

(54) DISPLAY APPARATUS AND LIGHT EMITTING MODULE THEREOF

(71) Applicant: Innolux Corporation, Miao-Li County (TW)

(72) Inventors: Jen-Chih Yang, Miao-Li County (TW); Cheng-Cheng Pan, Miao-Li County (TW); Ta-Chin Huang, Miao-Li County (TW); Chou-Yu Kang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 238 days.

(21) Appl. No.: 14/133,725

(22) Filed: Dec. 19, 2013

(65) Prior Publication Data

US 2014/0204611 A1    Jul. 24, 2014

(30) Foreign Application Priority Data

Jan. 22, 2013  (TW) .............................. 102102356 A

(51) Int. Cl.
*F21V 8/00* (2006.01)

(52) U.S. Cl.
CPC ............ *G02B 6/0061* (2013.01); *G02B 6/0038* (2013.01)

(58) Field of Classification Search
CPC ............................. G02B 6/0061; G02B 6/0038
See application file for complete search history.

(56) References Cited

U.S. PATENT DOCUMENTS

| | | | | |
|---|---|---|---|---|
| 6,074,069 A * | 6/2000 | Chao-Ching | ........ | G02B 6/0061 362/23.15 |
| 7,252,427 B2 * | 8/2007 | Teng | .................... | G02B 6/0038 362/339 |
| 7,515,223 B2 | 4/2009 | Lee et al. | | |
| 8,821,001 B2 | 9/2014 | Minami | | |
| 2002/0101551 A1 | 8/2002 | Akaoka | | |
| 2004/0085748 A1 | 5/2004 | Sugiura | | |
| 2011/0242441 A1 | 10/2011 | Minami | | |
| 2011/0317261 A1 | 12/2011 | Minami et al. | | |
| 2012/0075698 A1 | 3/2012 | Minami | | |
| 2012/0195072 A1 | 8/2012 | Minami | | |
| 2012/0256974 A1 | 10/2012 | Minami | | |

(Continued)

FOREIGN PATENT DOCUMENTS

| | | |
|---|---|---|
| CN | 1480771 A | 3/2004 |
| CN | 1497307 A | 5/2004 |

(Continued)

OTHER PUBLICATIONS

TW Office Action dated Nov. 3, 2014.

(Continued)

*Primary Examiner* — David V Bruce
(74) *Attorney, Agent, or Firm* — McClure, Qualey & Rodack, LLP

(57) ABSTRACT

A display apparatus comprising a display panel and a light emitting module disposed oppositely is provided. The light emitting module comprises a light guide plate, a plurality of light guide grooves and at least a light unit. The light guide plate has at least a light incident surface, a first surface and a second surface opposite to the first I surface. The light guide grooves are disposed on the first surface. Each light guide groove has a bottom, which is the portion of each light guide groove closest to the second surface, wherein the larger the distance from the bottom to the closest light unit, the smaller the distance from the bottom to the second surface.

13 Claims, 3 Drawing Sheets

(56) References Cited

U.S. PATENT DOCUMENTS

| | | |
|---|---|---|
| 2012/0257406 A1 | 10/2012 | Minami |
| 2012/0275183 A1 | 11/2012 | Minami |

FOREIGN PATENT DOCUMENTS

| | | |
|---|---|---|
| CN | 102736318 A | 10/2012 |
| EP | 1134488 A1 | 9/2001 |
| EP | 1336876 A1 | 8/2003 |
| TW | I237144 | 8/2005 |
| TW | 201248081 A1 | 12/2012 |

OTHER PUBLICATIONS

EP Search Report dated Feb. 17, 2015 in corresponding European application (No. 13199787.6-1562/2757314).

SIPO Office Action dated Nov. 19, 2015 in corresponding CN application (No. 201310022153.1).

\* cited by examiner

US 9,360,616 B2

DISPLAY APPARATUS AND LIGHT EMITTING MODULE THEREOF

This application claims the benefit of Taiwan application Serial No. 102102356, filed Jan. 22, 2013, the subject matter of which is incorporated herein by reference.

BACKGROUND OF THE INVENTION

1. Field of the Invention

The invention relates in general to a display apparatus and a light emitting module thereof, and more particularly to a display apparatus having high luminance uniformity and low luminance variation and a light emitting module thereof.

2. Description of the Related Art

In recent years, 2D flat panel display can no longer meet consumers requirements, and the display industry starts to place the focus on the development of 3D stereoscopic display technology.

The parallax barrier display technology, often used in the naked eye 3D display, is based on the principles of light obscuration. A parallax barrier could be a sheet or an electro optic panel with fine slits to separate the light pathway of spatial images into images for left eye and right eye, and this reconstructed scene of the left eye image and right eye image is perceived as 3D images by the observer.

According to a display, the parallax barrier is directly disposed in the light guide plate having a plurality of parallel light guide grooves disposed therein. The light is guided off the corresponding light emitting surface of each light guide groove in a manner with the bright state and the dark state being staggered with each other. The travel and path of the light from the light incident surface to different light guide grooves are different as well. When the light is reflected by the light guide grooves and emitted off the light emitting surface, the luminance levels of the bright lines or dark lines are not uniform, so that the overall luminance has larger variation. In greater details, the luminance variation of the display apparatus integrating the parallax barrier and the light guide plate is as high as 4-6, which is a large burden to the viewer. The luminance variation refers to the ratio of the largest luminance to the smallest luminance on a display plane.

SUMMARY OF THE INVENTION

The invention is directed to a display apparatus and a light emitting module thereof. The distance from the bottom of each light guide groove to a light guide plate surface (light emitting surface) is adjusted according to the distance from the light guide groove to a light incident surface closest to the light source, such that the luminance of the light has low variation, and the luminance of the light on the light emitting surface has high uniformity.

According to one embodiment of the present invention, a light emitting module comprising a light guide plate, at least a light unit and a plurality of light guide grooves is provided. The light guide plate has a first light incident surface, a second light incident surface, a first surface and a second surface, wherein the second light incident surface is opposite to the first light incident surface, and the second surface is opposite to the first surface. Each light guide groove is disposed on the first surface at an interval. Each light guide groove has a bottom, which is the portion of each light guide groove closest to the second surface. After the light emitted from the light unit enters the light guide plate, the light with the bright state and the dark state being staggered with each other is guided by the light guide grooves to be emitted off the second surface of the light guide plate. The light guide plate has a light unit in each of the first light incident surface and the second light incident surface. The distance from each bottom to the second surface is determined by following equation: $y'=D-(ax^2+bx+c)$. The unit of x, y' and D is μm, x denotes the smallest distance from the bottom of each light guide groove to the first light incident surface and 0<x, y' denotes the distance from the bottom of each light guide groove to the second surface, D denotes the thickness of the thickest portion of the light guide plate, a, b, c are constants, and $100<D\leq10000$, $-0.01\leq a<0$, $0<b\leq1$ and $0<c\leq50$.

According to another embodiment of the present invention, a light emitting module comprising a light guide plate, light unit and a plurality of light guide grooves is provided. The light guide plate has a light incident surface, a first surface, and a second surface opposite to the first surface. Each light guide groove is disposed on the first surface at an interval. Each light guide groove has a bottom, which is the portion of each light guide groove closest to the second surface. After the light emitted from the light unit enters the light guide plate, the light with the bright state and the dark state being staggered with each other is guided by the light guide grooves to be emitted off the second surface of the light guide plate. The light guide plate has a light unit only on the light incident surface. The distance from each bottom to the second surface is determined by following equation: $y'=D-(bx+c)$, wherein the unit of x, y' and D is μm, x denotes the smallest distance from the bottom of each light guide groove to light incident surface and 0<x, y' denotes the distance from the bottom of each light guide groove to the second surface, D denotes the thickness of the thickest portion of the light guide plate, b, c are constants, and $100<D\leq10000$, $0.01<b\leq0.3$, $5\leq c\leq50$.

According to an alternate embodiment of the present invention, a display apparatus comprising a display panel and a light emitting module is provided. The light emitting module is disposed oppositely to the display panel, and comprises a light guide plate, at least a light unit and a plurality of light guide grooves. The light guide plate has a first light incident surface, a second light incident surface, a first surface, and a second surface, wherein the second light incident surface is opposite to the first light incident surface and the second surface is opposite to the first surface. Each light guide groove is disposed on the first surface at an interval. Each light guide groove has a bottom, which is the portion of each light guide groove closest to the second surface. After the light emitted from the light unit enters the light guide plate, the light with the bright state and the dark state being staggered with each other is guided by the light guide grooves to be emitted off the second surface of the light guide plate. The central line of each light guide groove has an angle with respect to the first light incident surface. The angle is larger than or equal to 0 degree and is smaller than 85 degrees, and the larger the distance from the bottom to the closest light unit, the smaller the distance from the bottom to the second surface.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
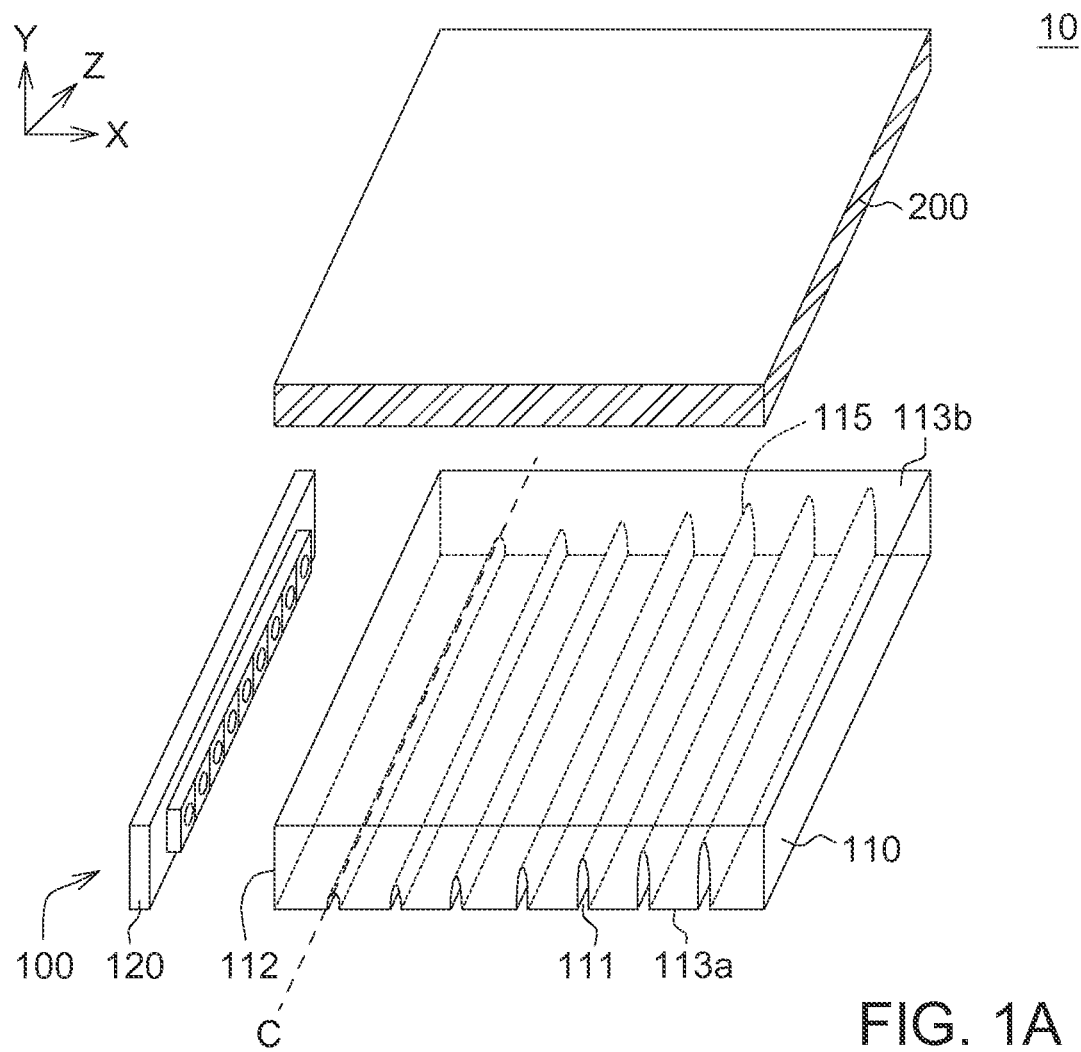
FIG. 1A shows a schematic diagram of a display apparatus according to one embodiment of the invention.

Referring to FIG. 1A, a schematic diagram of a display apparatus according to one embodiment of the invention is shown. The display apparatus 10 comprises a light emitting module 100 and a display panel 200 disposed oppositely. The light emitting module 100 comprises a light guide plate 110, a plurality of light guide grooves 111 and a first light unit 120.

Figure 1B:
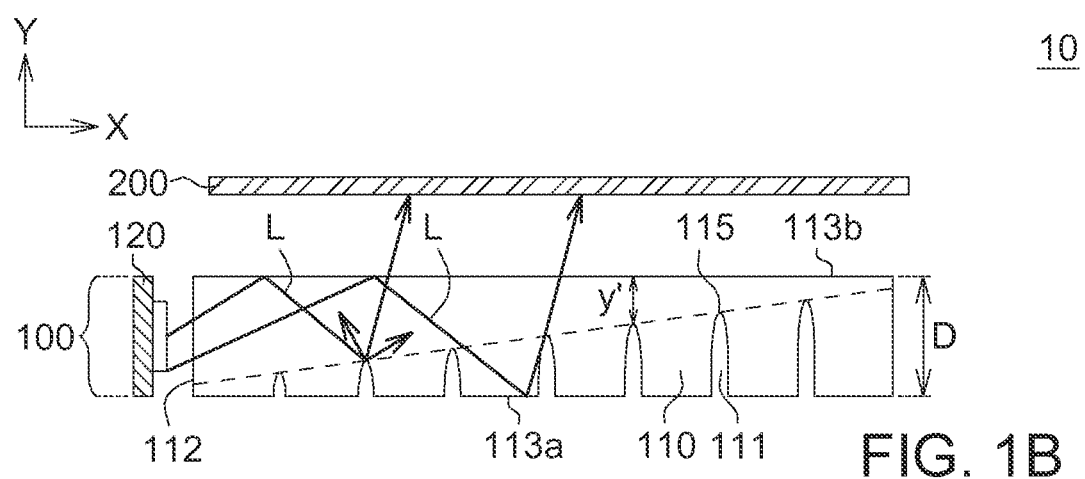
FIG. 1B shows a cross-sectional view of the display apparatus of FIG. 1A along a direction perpendicular to a light incident surface.

The light guide plate 110 comprises a first light incident surface 112, a first surface 113a and a second surface 113b opposite to the first surface 113a. The light guide plate 110, which guides the proceeding direction of the light, is formed by a transparent material such as acrylic resin, polycarbonate, polyethylene resins or glass, or any material whose index of refraction is greater than the surrounding material of the light guide plate 110 (the surrounding material is such as the air whose index of refraction is about equal to 1). Referring to FIG. 1B, a cross-sectional view of the display apparatus of FIG. 1A along a direction (XY direction) perpendicular to a light incident surface is shown. The light L having a specific angle can generate total reflection effect at the boundary between the light guide plate 110 and its peripheral material for guiding the light L entering the first light incident surface 112 to the central region, so that the emitted light is more uniformly distributed. Besides, the cross-section of the light guide plate 110 can be flat-shaped or wedge-shaped. In the present embodiment, the light guide plate 110 is flat-shaped, and has a uniform thickness D.

The first surface 113a and the second surface 113b of the light guide plate 110 are disposed oppositely, wherein the first surface or the second surface refers to all surfaces of the light guide plate 110 with larger areas. Referring to FIG. 1A, the second surface 113b is opposite to the display panel 200. That is, the second surface 113b is an upper surface (light emitting surface) of the light guide plate 110, and the first surface 113a is a lower surface of the light guide plate 110.

Referring to FIG. 1B, the light guide grooves 111 are disposed on the first surface 113a at an interval and each light guide groove 111 has a bottom 115 depressed towards the second surface 113b. The bottom 115 is the portion of each light guide groove 111 closest to the second surface 113b. A reflective material can be interposed to or coated on the light guide grooves 111 for enhancing the reflectivity of the light guide grooves 111. In general, the light L continues total reflection on the light guide plate 110. However, when the light L enters the light guide grooves 111, the light guide grooves 111 can guide the light L to be emitted off the second surface 113b (light emitting surface), so that the light is emitted in a manner with the bright state and the dark state being staggered with each other.

Referring to FIG. 1A, the central line C of each light guide groove 111 is parallel to the first light incident surface 112. That is, the angle between the central line C and the first light incident surface 112 is 0 degree.

In the present example, the light source closest to the light guide grooves 111 is located on the first light incident surface 112. Therefore, the larger the distance from the bottom 115 of a light guide groove 111 to the first light incident surface 112, the smaller the distance from the bottom 115 of the light guide groove 111 to the second surface 113b. In other words, the larger the distance from the bottom 115 of a light guide groove 111 to the first light incident surface 112, the smaller the remaining thickness of the light guide plate (that is, the smaller the distance from the bottom 115 of the light guide groove 111 to the second surface 113b). Since the distance from the bottom 115 of a light guide groove 111 to the second surface 113b is different for each of the light guide grooves 111, each light guide groove 111 can compensate the travel and path of the light from the first light incident surface 112 to each light guide groove 111, such that the luminance of the light guided by the light guide grooves 111 to be emitted off the second surface 113b has lower variation and higher uniformity.

In one embodiment, when the light emitting element is disposed on only one side of the light guide grooves 111, both the distance from the bottom 115 of the light guide grooves 111 to the first light incident surface 112 and the depth of the light guide grooves 111 can be determined by the following linear equation: $y=bx+c$, wherein, x denotes the smallest distance from the light guide grooves to the first light incident surface, y denotes the depth of the light guide grooves, and $0.01<b\leq0.3$, $5\leq c\leq50$. When the light guide plate is flat-shaped and has a uniform thickness D, the distance y' (remaining thickness) from the bottom 115 of the light guide grooves 111 to the second surface 113b of the light guide plate is equal to $(D-y)$, and is determined by a linear equation $y'=D-(bx+c)$, wherein the unit of x, y' and D is μm. In one embodiment, when $0<x$, b and c are constants, and $100<D\leq10000$, $0.01<b\leq0.3$, $5\leq c\leq50$.

Figure 1C:
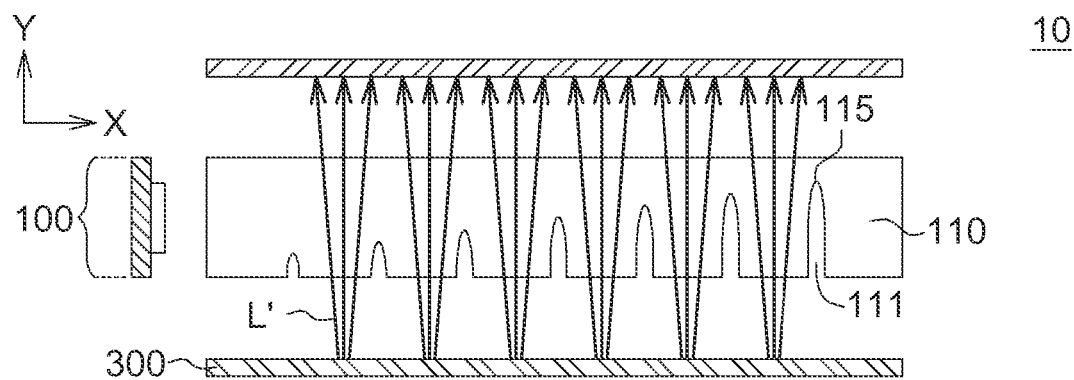
FIG. 1C shows a cross-sectional view of a display apparatus according to one embodiment of the invention.

Referring to FIG. 1C. In one embodiment, the display apparatus 10 may further comprise a backlight module 300 disposed under the light emitting module 100 for providing a light L' to the display panel 200. When the backlight module 300 is turned on, the light L' passes through the entire light guide plate 110. Since the brightness state is consistent, the display apparatus 10 displays a 2D image. When the backlight module 300 is turned off and only the light emitting module 100 emits a light, the light is provided in a manner with the bright state and the dark state being staggered with each other for displaying a 3D image. Thus, the image modes can be switched for enabling the display apparatus 10 to display a 2D image or a 3D image.

Figure 2A:
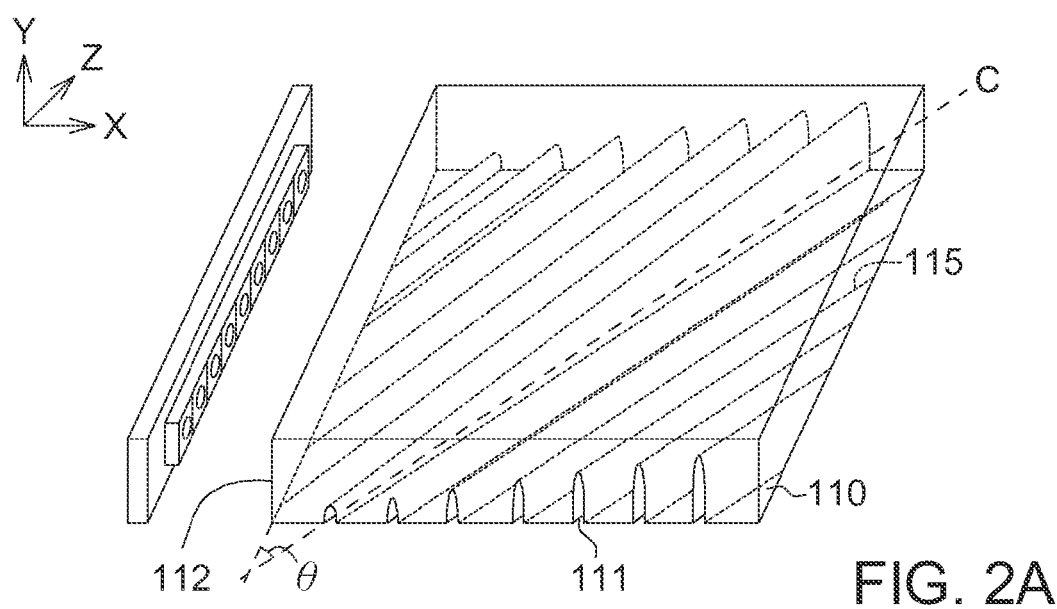
FIG. 2A shows a schematic diagram of a light emitting module according to one embodiment of the invention.
Figure 2B:
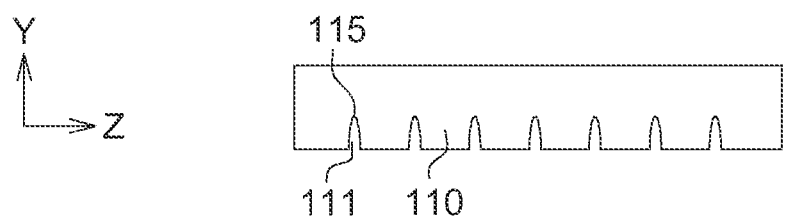
FIG. 2B shows a cross-sectional view of the light emitting module of FIG. 2A along a direction parallel to a light incident surface.

Referring to FIGS. 2A and 2B. FIG. 2A shows a schematic diagram of a light emitting module according to one embodiment of the invention. FIG. 2B shows a cross-sectional view of the light emitting module of FIG. 2A along a direction (YZ direction) parallel to a light incident surface. The light emitting module of the present embodiment of the invention is different from the light emitting module 100 of FIG. 1A mainly in the arrangement of the light guide grooves 111, and the similarities are not repeated here.

The light guide grooves 111 of FIG. 1A are parallel to the first light Incident surface 112 (YZ direction). That is, the angle between the central line C and the first light incident surface 112 is 0 degree, and each light guide groove has the same depth. Referring to FIG. 2A. The light guide grooves 111 are obliquely arranged, the central line C of each light guide groove 111 has an angle θ with respect to the first light incident surface 112, wherein the angle θ is larger than 0 degree but smaller than 85 degrees. Therefore, in the single light guide grooves 111, the portion closer to the first light incident surface 112 have smaller depth, and the portion farther away from the light incident surface have larger depth. For simplification purpose, FIG. 2A only illustrates the light guide grooves 111 in the direction of the XY plane. As indicated in FIG. 2B, the cross-section of each light guide groove 111 in a direction (YZ direction) parallel to a light incident surface has the same size. In the present embodiment of the invention, the light guide grooves 111 are obliquely arranged. However, the invention is not limited thereto. In other embodiments, the light guide grooves can also be arranged in an arc shape as long as the light guide grooves are not intersecting with each other.

Figure 3:
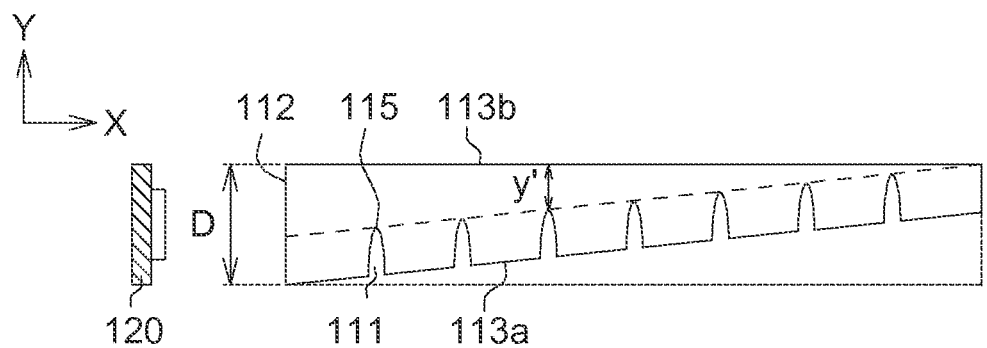
FIG. 3 shows a cross-sectional view of a light emitting module along a direction perpendicular to a light incident surface according to one embodiment of the invention.

Referring to FIG. 3, a cross-sectional view of a light emitting module along a direction (XY direction) perpendicular to a light incident surface according to one embodiment of the invention is shown. The light emitting module of the present embodiment of the invention is different from the light emitting module of the above embodiment mainly in the shape of the light guide plate, and the similarities are not repeated here.

As indicated in FIG. 3, the cross-section of the light guide plate 110 is wedge-shaped, wherein one end is thicker than the other end and the thickest portion has a thickness D and is used as the first light incident surface 112. In the present example, the light guide grooves 111 have the same depth. Since the thickness of the light guide plate 110 is not uniform, the larger the distance from the light guide grooves 111 to the first light incident surface 112, the smaller the remaining thickness of the light guide plate 110 corresponding to the bottom 115 of the light guide grooves 111. Conversely, the smaller the distance from the light guide grooves 111 to the first light incident surface 112, the larger the remaining thickness of the light guide plate 110 corresponding to the bottom 115 of the light guide grooves 111. When the light is farther away from the first light incident surface 112, the bottom 115 of the light guide grooves 111 is closer to the second surface 113b, and the light is easier to be emitted from the second surface 113b. Therefore, the luminance of the light emitted from the second surface 113b has low variation and high uniformity. As indicated in FIG. 3, in the light emitting module with one light incident surface, the distance y' from the bottom 115 of the light guide grooves to the second surface 113b of the light guide plate, that is, the remaining thickness of the light guide plate, can be determined by a linear equation y'=D−(bx+c), wherein x denotes the smallest distance from grooves and light incident surface, D denotes the thickness of the thickest portion of the light guide plate, b, c are constants, and $100 < D \leq 10000$, $0.01 < b \leq 0.3$, $5 \leq c \leq 50$.

Figure 4:
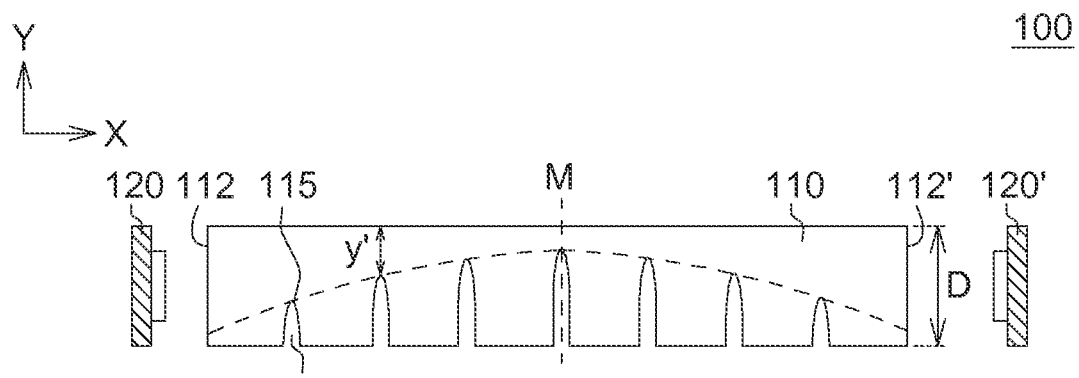
FIG. 4 shows a cross-sectional view of a light emitting module along a direction perpendicular to a light incident surface according to one embodiment of the invention.

Referring to FIG. 4, a cross-sectional view of a light emitting module along a direction (XY direction) perpendicular to a light incident surface according to one embodiment of the invention is shown. The light emitting module of the present embodiment of the invention is different from the light emitting module of the above embodiments in that the light emitting module of the present embodiment of the invention further has a second light unit, and the similarities are not repeated here.

As indicated in FIG. 4, the light emitting module 100 comprises a light guide plate 110, a plurality of light guide grooves 111, a first light unit 120 and a second light unit 120'. The first light unit 120 and the second light unit 120' are respectively disposed on two sides of the light guide plate 110. The light guide plate 110 has two opposite light incident surfaces, namely, the first light incident surface 112 and the second light incident surface 112'. The light emitted from the first light unit 120 and the second light unit 120' enters the light guide plate 110 through the first light incident surface 112 and the second light incident surface 112' respectively.

As indicated in FIG. 4, the light guide plate 110 has a middle line M parallel to the light incident surface (YZ direction). The central line of each light guide groove 111 has an angle θ with respect to the first light incident surface 112, wherein the angle θ is greater than or equal to 0 degree but smaller than 85 degrees. The angle between the light guide grooves 111 of the present embodiment of the invention is equal to 0. That is, the light guide grooves 111 are disposed in parallel and symmetric to the middle line M. Referring to FIG. 4, the light guide grooves 111 are disposed on the first surface 113a of the light guide plate 110. The larger the distance from each light guide groove 111 to the first light incident surface 112 or the second light incident surface 112' of the closest light unit, the larger the distance from the bottom 115 of each light guide groove 111 to the second surface 113b. Conversely, the larger the distance from each light guide groove 111 to the first light incident surface 112 or the second light incident surface 112' of the closest light unit, the smaller the distance from the bottom 115 of each light guide groove 111 to the second surface 113b. That is, the smaller the distance from the light guide grooves 111 to the middle line M of the light guide plate 110, the larger the depth of the light guide grooves 111, and the smaller the remaining thickness of the light guide plate 110 (the distance from the bottom 115 of the light guide grooves 111 to the second surface 113b). Since the distance from the bottom 11 to the second surface 113b is different for each of the light guide grooves 111, the light guide grooves 111 can compensate the course and path of the light from the first light incident surface 112 to each light guide groove 111, such that the luminance of the light guided by the light guide grooves 111 to be emitted off the second surface 113b has low variation and high uniformity.

In the present embodiment, when the light emitting elements are disposed on both sides of the light guide grooves 111, the distance from the light guide grooves 111 to any light incident surface and the depth of the light guide grooves can be determined by the following equation: $y = ax^2 + bx + c$, wherein, x denotes the smallest distance from the light guide grooves to the first light incident surface, y denotes the depth of the light guide grooves, $-0.01 \leq a \leq 0$, $0 < b \leq 1$ and $0 < c \leq 50$. When the light guide plate is flat-shaped and has a uniform thickness D, the distance y' from the bottom of the light guide grooves to the second surface of the light guide plate (remaining thickness) is equal to (D−y), and is determined by the equation $y' = D − (ax^2 + bx + c)$, wherein the distance unit is μm, a, b, c are constants, and $100 < D \leq 10000$, $-0.01 \leq a \leq 0$, $0 < b \leq 1$ and $0 < c \leq 50$.

TABLE 1

Size of light guide plate vs. corresponding coefficients

| Size of Light Guide Plate (inches) | a | b | c | Luminance Variation |
|---|---|---|---|---|
| 10.1 | −0.0030612 | 0.4286 | 20 | ≤1.33 |
| 23.6 | −0.00391 | 0.125 | 20 | |
| 23.6 | −0.00586 | 0.25 | 15 | |
| 50 | −0.00009804 | 0.62745 | 20 | |
| 50 | −0.0001471 | 0.0941 | 10 | |

Table 1 shows 5 different sizes of light guide plate and corresponding coefficients, and the measured luminance variation. However, these values are for exemplification purpose only, and the invention is not limited thereto. The luminance variation of conventional display apparatus is between 4-6. The luminance variation of the light guide plate of the invention is effectively reduced to be below 1.33 no matter the light guide plate is used in a handheld tablet (7-10 inches), a personal/office desktop display (19-23 inches), or an entertainment/household large-sized TV (30-60 inches), such that the luminance has low variation, and luminance uniformity is greatly increased.

Figure 5:
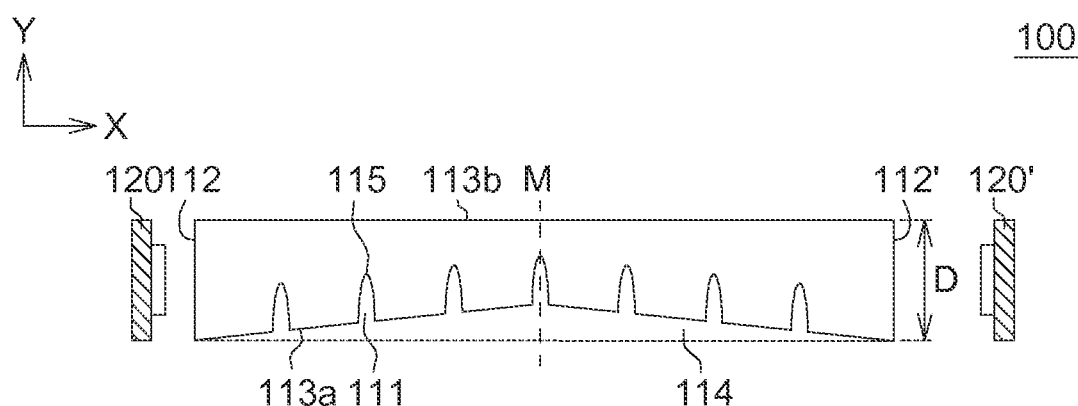
FIG. 5 shows a cross-sectional view of a light emitting module along a direction perpendicular to a light incident surface according to one embodiment of the invention.

Referring to FIG. 5, a cross-sectional view of a light emitting module along a direction (XY direction) perpendicular to a light incident surface according to one embodiment of the invention is shown. The light emitting module of the present embodiment of the invention is different from the light emitting module of FIG. 5 mainly in the shape of the light guide plate, and the similarities are not repeated here.

In the present example, the light guide plate 110 has an inverted V-shaped gap whose apex is aligned with the middle line M of the light guide plate parallel to light incident surface (YZ direction), such that the light guide plate is thinner in the middle, thicker in the two sides, and symmetric with respect to the middle line M, and the thickness of the thickest portion of the light guide plate is D.

The light guide grooves 111 of FIG. 5 have the same depth. Since the thickness of the light guide plate 110 is not uniform, the smaller the distance from the light guide grooves 111 to the first light incident surface 112 or the second light incident surface 112' of the closest light source, the larger the distance from the bottom 115 to the second surface 113b. Conversely, the larger the distance from the light guide grooves 111 to the first light incident surface 112 or the second light incident surface 112' of the closest light source, the smaller the distance from the bottom 115 to the second surface 113b. That is, the light guide grooves 111 closer to the middle line M corresponds to smaller remaining thickness of the light guide plate 110. Since the distance from the bottom 115 to the second surface 113b is different for each of the light guide grooves 111, the light guide grooves 111 can compensate the course and path of the light from the first light incident surface 112 to each light guide groove 111, such that the luminance of the light guided by the light guide grooves 111 to be emitted off the second surface 113b has low variation and high uniformity. As indicated in FIG. 5, when the light emitting elements are disposed on two sides of the light guide plate 110, the distance y' from the bottom 115 of the light guide grooves 111 to the second surface 113b of the light guide plate (remaining thickness) can be determined by a equation $y'=D-(ax^2+bx+c)$, wherein x denotes the smallest distance from the light guide grooves to light incident surface, denotes the thickness of the thickest portion of the light guide plate, a, b, c are constants, and $100<D\leq10000$, $-0.01\leq a<0$, $0<b\leq1$ and $0<c\leq50$.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light emitting module, comprising:
    a light guide plate having a first light incident surface, a second light incident surface, a first surface and a second surface, wherein the first light incident surface is opposite to the second light incident surface, and the first surface is opposite to the second surface;
    at least two light units; and
    a plurality of light guide grooves each being disposed on the first surface at an interval and having a bottom being the portion of each light guide groove closest to the second surface, wherein after the light emitted from the light unit enters the light guide plate, the light is guided by the light guide grooves to be emitted off the second surface of the light guide plate;
    wherein, the light guide plate has the two light units respectively on each of the first light incident surface and the second light incident surface, and the distance from each bottom to the second surface is determined by following equation:
    $y'=D-(ax^2+bx+c)$, wherein the unit of x, y' and D is µm, x denotes the smallest distance from the bottom of the light guide plate to the first light incident surface and $0<x$, y' denotes the distance from the bottom of the light guide plate to the second surface, D denotes the thickness of the thickest portion of the light guide plate, a, b, c are constants, and $100<D\leq10000$, $-0.01\leq a<0$, $0<b\leq1$ and $0<c\leq50$.

2. The light emitting module according to claim 1, wherein the luminance variation of the light emitting module is smaller than or equal to 1.33 but greater than 0.

3. A light emitting module, comprising:
    a light guide plate having a light incident surface, a first surface and a second surface opposite to the first surface;
    a light unit; and
    a plurality of light guide grooves each being disposed on the first surface at an interval and having a bottom being the portion of each light guide groove closest to the second surface, wherein after the light emitted from the light unit enters the light guide plate, the light is guided by the light guide grooves to be emitted off the second surface of the light guide plate;
    wherein, the light guide plate has the light unit only on the light incident surface, and the distance from each bottom to the second surface is determined by following equation:
    $y'=D-(bx+c)$, the unit of x, y' and D is µm, x denotes the smallest distance from the bottom of the light guide plate to the light incident surface and $0<x$, y' denotes the distance from the bottom of the light guide plate to the second surface, D denotes the thickness of the thickest portion of the light guide plate, b, c are constants, and $100<D\leq10000$, $0.01<b\leq0.3$, $5\leq c\leq50$.

4. The light emitting module according to claim 3, wherein the luminance variation of the light emitting module is smaller than or equal to 1.33 but greater than 0.

5. A display apparatus, comprising:
    a display panel; and
    a light emitting module disposed opposite to the display panel, wherein the light emitting module comprises:
    a light guide plate having a first light incident surface, a second light incident surface, a first surface and a second surface, wherein the first light incident surface is opposite to the second light incident surface, and the first surface is opposite to the second surface;
    at least two light units; and
    a plurality of light guide grooves each being disposed on the first surface at an interval and having a bottom being the portion of each light guide groove closest to the second surface, wherein after the light emitted from the light unit enters the light guide plate, the light is guided by the light guide grooves to be emitted off the second surface of the light guide plate;

wherein, the central line of each light guide groove has an angle with respect to the first light incident surface, the angle is larger than or equal to 0 degree but smaller than 85 degrees, and the larger the distance from each bottom to the closest the light unit, the smaller the distance from the bottom to the second surface, wherein, the light guide plate has the two light units respectively on each of the first light incident surface and the second light incident surface, and the distance from each bottom to the second surface is determined by following equation:

$y'=D-(ax^2+bx+c)$, the unit of x, y' and D is μm, x denotes the smallest distance from the bottom of the light guide plate to the first light incident surface and 0<x, y' denotes the distance from the bottom of the light guide plate to the second surface, D denotes the thickness of the thickest portion of the light guide plate, a, b, c are constants, and $100<D\leq10000$, $-0.01\leq a\leq0$, $0<b\leq1$ and $0<c\leq50$.

6. The display apparatus according to claim 5, wherein the luminance variation of the light emitting module is smaller than or equal to 1.33 but greater than 0.

7. The display apparatus according to claim 5, wherein the light emitting module is a parallax barrier element of the display apparatus.

8. The display apparatus according to claim 5, wherein the display apparatus further comprises a backlight module interposed between the display panel and the backlight module, and the backlight module is turned off when the display apparatus displays a 3D image and is turned on when the display apparatus displays a 2D image.

9. A display apparatus, comprising:
a display panel; and
a light emitting module disposed opposite to the display panel, wherein the light emitting module comprises:
a light guide plate having a light incident surface, a first surface and a second surface, wherein the first surface is opposite to the second surface;
a light unit; and
a plurality of light guide grooves each being disposed on the first surface at an interval and having a bottom being the portion of each light guide groove closest to the second surface, wherein after the light emitted from the light unit enters the light guide plate, the light is guided by the light guide grooves to be emitted off the second surface of the light guide plate;

wherein, the central line of each light guide groove has an angle with respect to the light incident surface, the angle is larger than or equal to 0 degree but smaller than 85 degrees, and the larger the distance from each bottom to the closest the light unit, the smaller the distance from the bottom to the second surface, and the light guide plate has the light unit only on the light incident surface, and the distance from each bottom to the second surface is determined by following equation:

$y'=D-(bx+c)$, the unit of x, y' and D is μm, x denotes the smallest distance from the bottom of the light guide plate to the light incident surface and 0<x, y' denotes the distance from the bottom of the light guide plate to the second surface, D denotes the thickness of the thickest portion of the light guide plate, b, c are constants, and $100<D\leq10000$, $0.01<b\leq0.3$, $5\leq c\leq50$.

10. The display apparatus according to claim 9, wherein the cross-section of the light guide plate orthogonal to the first light incident surface is wedge-shaped, and each light guide groove has the same depth.

11. The display apparatus according to claim 9, wherein the luminance variation of the light emitting module is smaller than or equal to 1.33 but greater than 0.

12. The display apparatus according to claim 9, wherein the light emitting module is a parallax barrier element of the display apparatus.

13. The display apparatus according to claim 9, wherein the display apparatus further comprises a backlight module interposed between the display panel and the backlight module, and the backlight module is turned off when the display apparatus displays a 3D image and is turned on when the display apparatus displays a 2D image.

* * * * *